O. OSTLIN.
DOUBLE SEAMING MACHINE.
APPLICATION FILED FEB. 26, 1908.

968,680.

Patented Aug. 30, 1910.
6 SHEETS—SHEET 2.

Witnesses:
Wm Geiger

Inventor:
Olaf Ostlin
By Munday, Evarts Adcock & Clarke
Attorneys

O. OSTLIN.
DOUBLE SEAMING MACHINE.
APPLICATION FILED FEB. 26, 1908.

968,680.

Patented Aug. 30, 1910.
6 SHEETS—SHEET 3.

Witnesses:

Inventor
Olaf Ostlin
By Munday, Evarts, Adcock & Clarke.
Attorneys

O. OSTLIN.
DOUBLE SEAMING MACHINE.
APPLICATION FILED FEB. 26, 1908.

968,680.

Patented Aug. 30, 1910.
6 SHEETS—SHEET 4.

Witnesses:
Wm. Geiger
H. W. Munday

Inventor:
Olaf Ostlin
By Munday, Evarts, Adcock & Clarke
Attorneys

O. OSTLIN.
DOUBLE SEAMING MACHINE.
APPLICATION FILED FEB. 26, 1908.

968,680.

Patented Aug. 30, 1910.

Witnesses:
Wm. Geiger
H. M. Munday

Inventor:
Olaf Ostlin
By Munday, Evarts, Adcock & Clarke
Attorneys

UNITED STATES PATENT OFFICE.

OLAF OSTLIN, OF MAYWOOD, ILLINOIS, ASSIGNOR TO AMERICAN CAN COMPANY, OF NEW YORK, N. Y., A CORPORATION OF NEW JERSEY.

DOUBLE-SEAMING MACHINE.

968,680.  Specification of Letters Patent.  Patented Aug. 30, 1910.

Application filed February 26, 1908. Serial No. 417,981.

*To all whom it may concern:*

Be it known that I, OLAF OSTLIN, a citizen of the United States, residing in Maywood, in the county of Cook and State of Illinois, have invented a new and useful Improvement in Double-Seaming Machines, of which the following is a specification.

My invention relates to improvements in double seaming machines.

The object of my invention is to provide a double seaming machine of a simple, efficient and durable construction, composed of few parts and capable of being cheaply manufactured, and in which the seaming rollers may be positively and accurately actuated and easily and quickly adjusted and maintained in adjustment, so as to produce hermetically tight seams, and in which the lower or reciprocating can holder or chuck may be operated by a foot lever or treadle, and in which the seaming rollers while set in operation by action of the foot lever or treadle may be automatically controlled as to their period of operation on each can independent of the foot lever or treadle, or of the operator's actuation of the same.

My invention consists in the means I employ to practically accomplish this object or result, as herein shown and described and more particularly set forth in the claims.

In the accompanying drawing, forming a part of this specification.

In the drawing A represents the frame of the machine, B the lower reciprocating can holder or chuck, C a feed table for the cans supported on an adjustable bracket $C^1$ attached to the frame. The chuck B has a stem or shank $b$ fitting in a suitable socket in a stem or rod $B^1$ which reciprocates up and down in a suitable guide $A^1$ on the frame of the machine. The can holder stem $B^1$ is operated or moved up and down as required to chuck or clamp the can against the opposing stationary or nonrotating chuck or disk D by means of a foot lever or treadle E pivoted to the frame at $E^1$, and furnished with a spring $E^2$ for returning it to position, and which treadle is connected by a pivotal link $E^3$ with the arm $E^4$ of a rock shaft $E^5$ which has a forked arm $E^6$ engaging a connecting block $E^7$ adjustably secured to the operating rod $B^1$ of the lower can holder B.

Figures 1, 17:
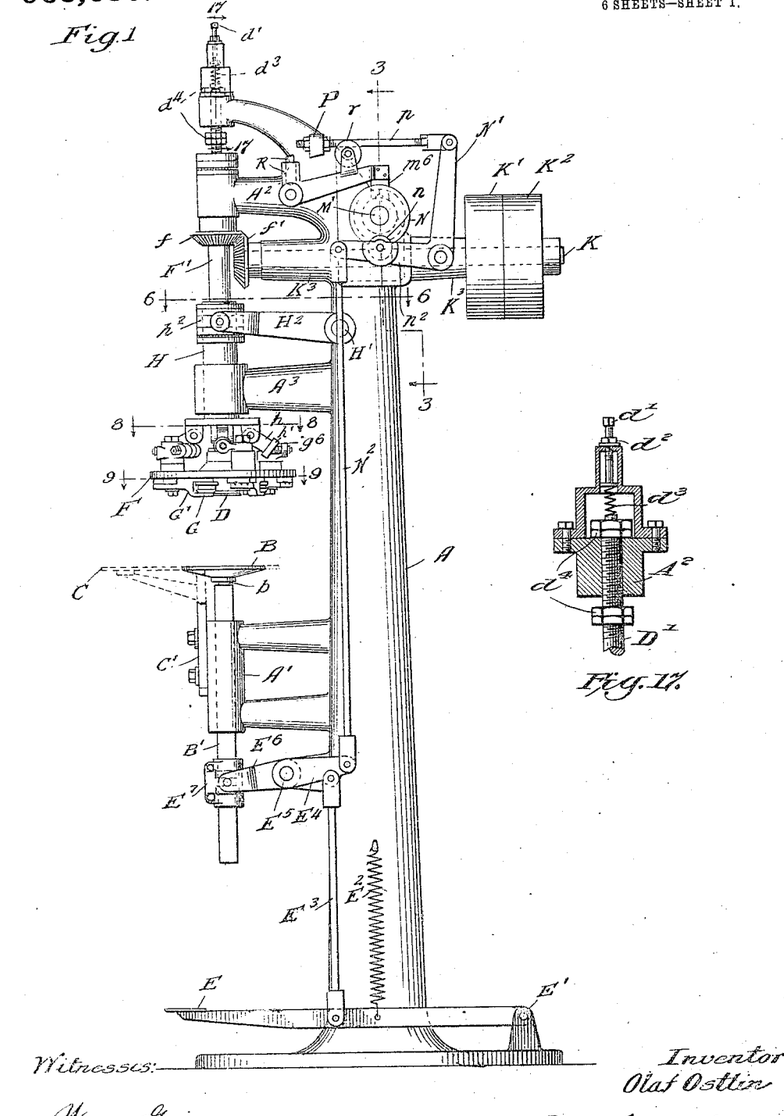
Figure 1 is a side elevation of a double seaming machine embodying my invention.
Fig. 16 is a detail view of a part hereinafter to be described and Fig. 17 is a detail section on line 17—17 of Fig. 1.
Figure 2:
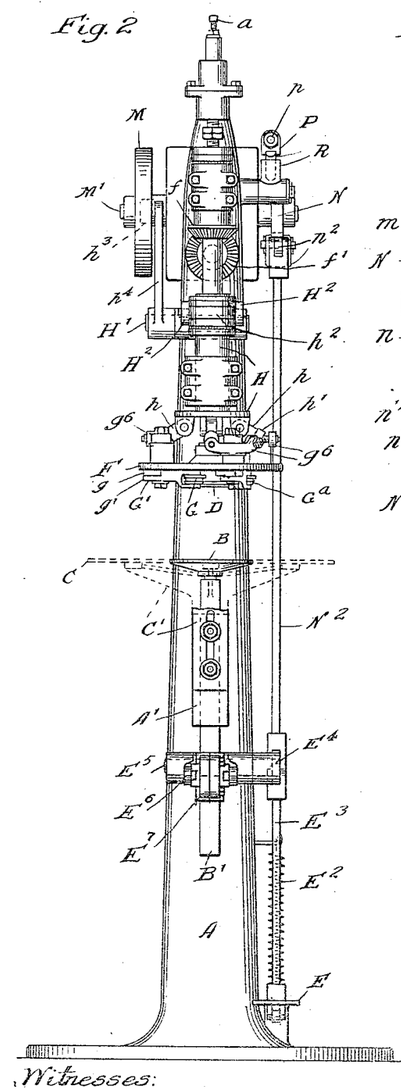
Fig. 2 a front elevation.
Figure 3:
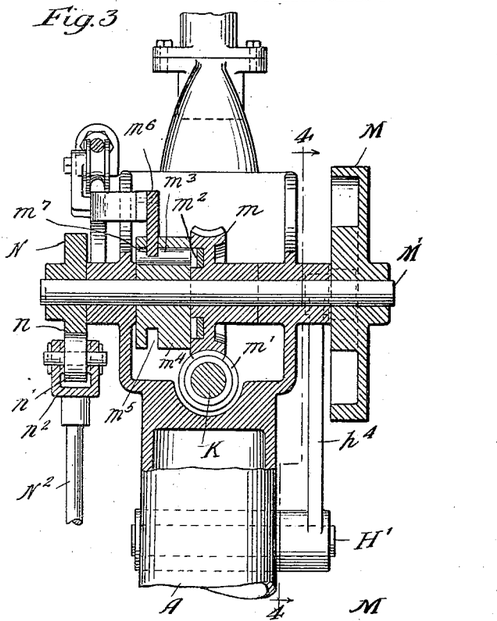
Fig. 3 a detail section on line 3—3 of Fig. 1.
Figure 4:
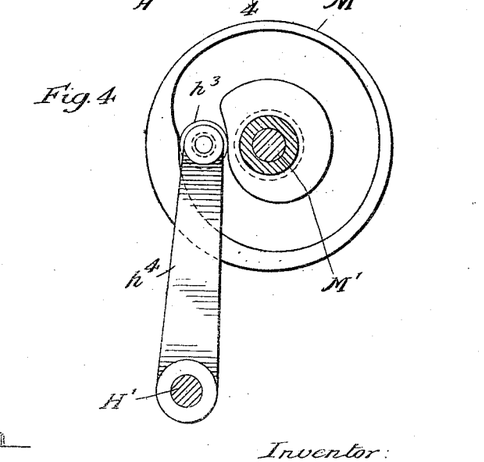
Fig. 4 a detail vertical section on line 4—4 of Fig. 3.
Figure 5:
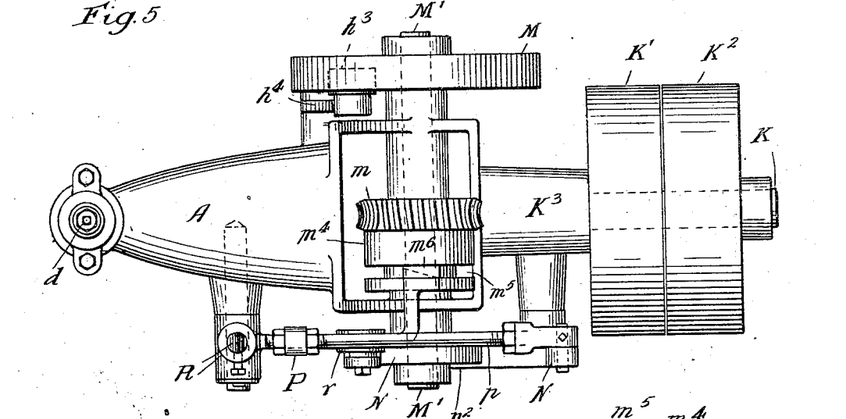
Fig. 5 a top or plan view.
Figure 6:
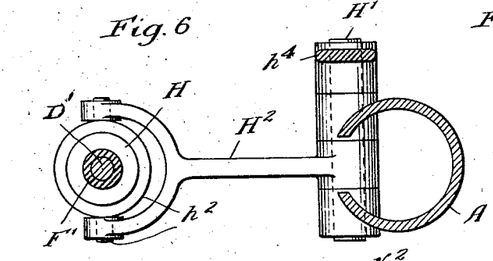
Fig. 6 a detail section on line 6—6 of Fig. 1.
Figure 7:
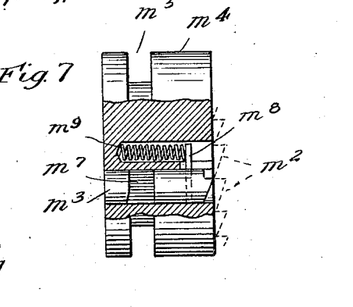
Fig. 7 a detail section of the clutch mechanism.
Figure 8:
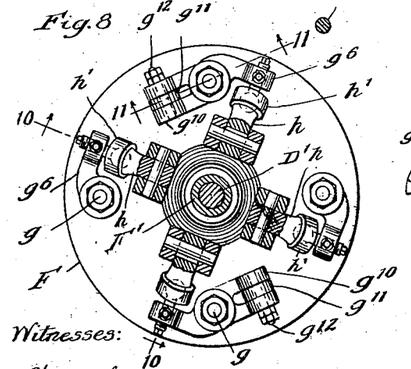
Fig. 8 is a detail section on line 8—8 of Fig. 1.
Figure 9:
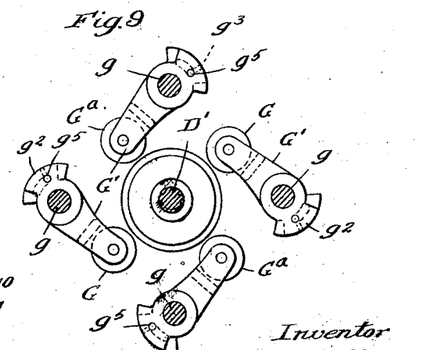
Fig. 9 is a section on line 9—9 of Fig. 1.
Figure 10:
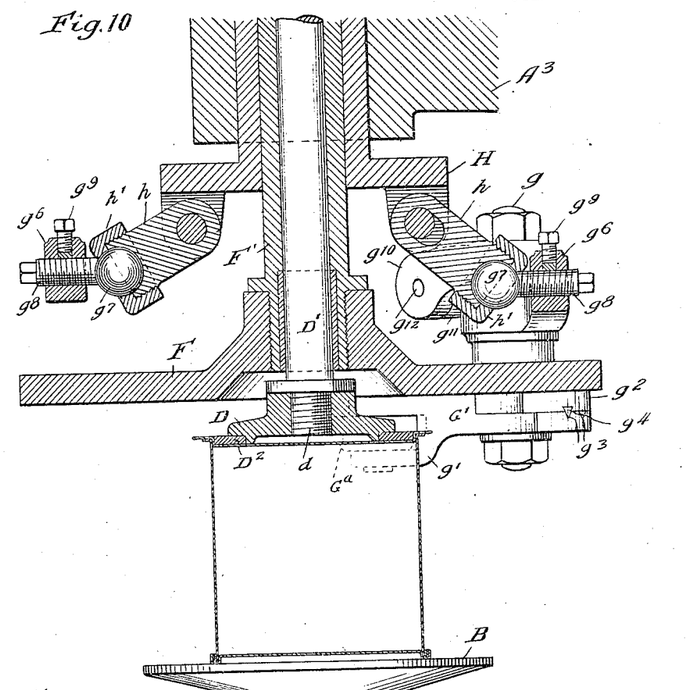
Fig. 10 is an enlarged vertical section on the right-angle line 10—10 of Fig. 8.
Figure 11:
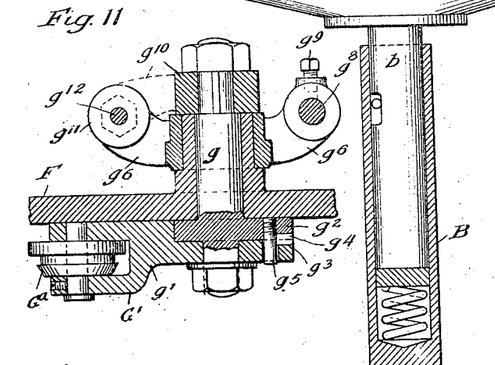
Fig. 11 is a detail section on line 11 of Fig. 8.
Figures 12, 13:
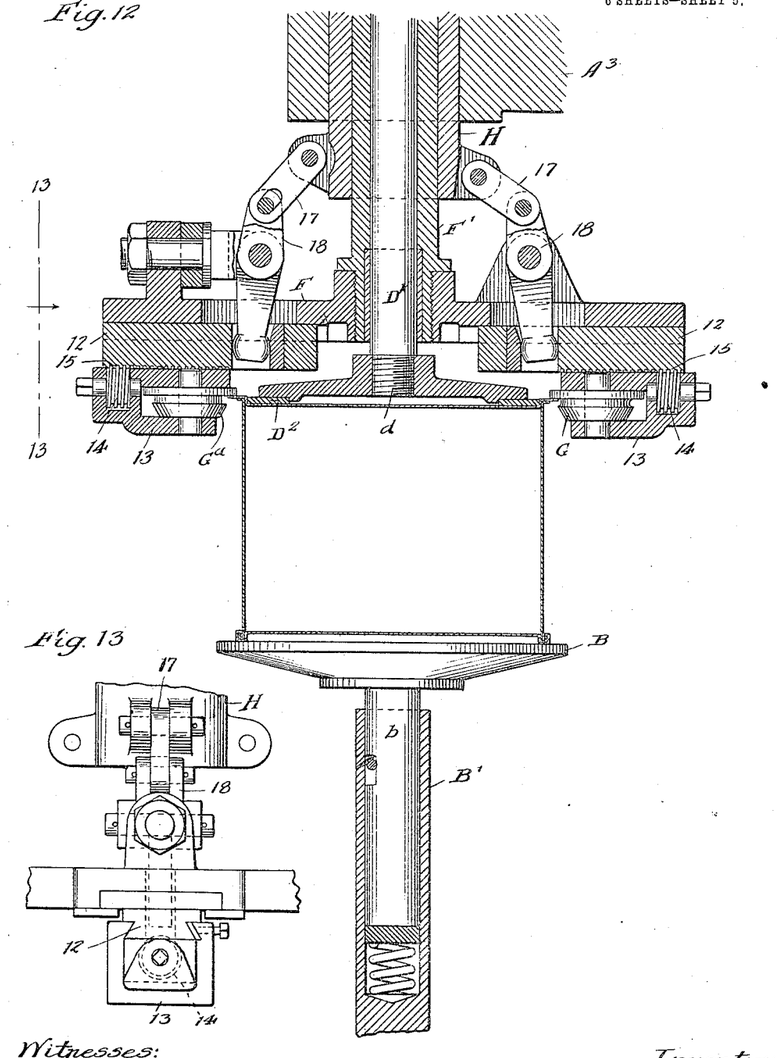
Fig. 12 is a sectional view similar to Fig. 10 illustrating a modification.
Fig. 13 is a detail elevation looking from the line 13—13 of Fig. 12.

F is a continuously rotating seaming head upon which the seaming rollers G $G^a$ and their movable holders $G^1$ are mounted and by which the same are carried rapidly around the can. The movable holders $G^1$ of the seaming rollers are preferably levers, as illustrated in Figs. 1 to 11 and 14 and 15, although reciprocating slides may be employed as the tool holders if preferred, as illustrated in Figs. 12 and 13, or other suitable tool holding means.

The rotary seaming head F has an integral hub furnished with screw threads for removably attaching it to its hollow rotating shaft or sleeve $F^1$, and said seaming head shaft or sleeve is continuously and rapidly rotated by means of a bevel gear $f$ thereon, which meshes with a bevel gear $f^1$ on the driving shaft K, and is furnished with fast and loose pulleys $K^1$ $K^2$ and is journaled in suitable bearings $K^3$ on the frame of the machine.

The upper stationary can holder or chuck D is removably connected by screw threads $d$ to a stationary or nonrotating shaft or stem $D^1$, which extends up through the hollow seaming head shaft $F^1$, and which is held in position by guides or arms $A^2$ $A^3$ on the frame of the machine, and which is furnished at its upper end with an adjusting screw $d^1$, having jam nuts $d^2$ and spring $d^3$ and adjusting screw nuts $d^4$ to give an adjustable yielding support to the chuck D. The chuck D is further provided with a removable ring $D^2$ to fit the can head to conveniently adapt the machine for operation upon cans of different sizes.

The seaming roller holders $G^1$ are preferably of a lever or rock shaft form, and are pivotally connected to the seaming head F by the shaft or pivot portion $g$ thereof, and each have a lower or seaming roller carrying arm $g^1$ adapted to swing horizontally under the seaming head and upon which the seaming roller is directly mounted. Each of the seaming roller holders or levers $G^1$ is also preferably furnished with a supplemental arm $g^2$ to which the roller carrying arm $g^1$ is adjustably connected, preferably by means of adjusting notches $g^3$ $g^4$ on said arms $g^2$ $g^1$ in connection with a set screw $g^5$, this facilitates adjustment of the machine for operation upon cans of different diameters. Each of the seaming roller levers or rock shafts $g^1$ is also furnished with an upper, horizontally swinging, operating arm $g^6$, carrying a ball and socket joint member $g^7$ preferably adjustably secured thereto by a screw stem $g^8$ and set screw $g^9$. The operating arms $g^6$ which actuate the finishing rollers $G^a$ are preferably also provided with supplemental members $g^{10}$, between which and the arm $g^6$ a rubber or other cushion $g^{11}$ is interposed, and to which supplemental arm $g^{10}$ the movable or yielding arm $g^6$ is secured by a clamp screw $g^{12}$. This enables the finishing roller to have a yielding pressure against the seam and aids materially in producing hermetically tight double seams.

The seaming rollers are automatically actuated as required by means of a continuously rotating and vertically reciprocating head or sleeve H surrounding the seaming head sleeve $F^1$ and which rotates at the same speed therewith, and which is connected with the seaming roller operating lever $g^6$ by toggle-acting links $h$ which have a ball and socket, or other equivalent or universal joint connection with said operating arm $g^6$. Each of the links $h$ is preferably furnished with a ball and socket joint member $h^1$ for connection with the ball and socket joint member $g^7$ on the seaming roller operating arm $g^6$. As the rotating head or sleeve H is reciprocated up and down it withdraws the seaming rollers from the can or throws them inward against the same. The ball and socket or universal joint connection between the toggle links and seaming roller operating arms enables the latter to swing in a horizontal plane, while the upper links swing in vertical planes as the seaming head rotates.

The seaming roller operating head or sleeve H is reciprocated up and down as required to operate the seaming rollers by means of a rock shaft $H^1$ having a forked arm $H^2$ engaging a collar $h^2$ on the sleeve H, and which rock shaft has an arm $h^4$ carrying a roller $h^3$ which engages a cam M on the cam shaft $M^1$.

The cam shaft $M^1$ is intermittently rotated as required to cause the seaming rollers to be properly actuated during the cycle or period necessary for performing the seaming operation on each can by means of a worm gear $m$ loose on the cam shaft and continuously driven by a worm $m^1$ on the driving gear shaft K, and which worm gear $m$ is furnished with a clutch member $m^2$ and is adapted to be at intervals clutched to the cam shaft $M^1$ by means of a clutch pin or member $m^3$ on the clutch sleeve $m^4$, which is furnished with an annular groove $m^5$ to receive a wedge or clutch disengaging device $m^6$ that operates to retract the clutch pin or member $m^3$ of the clutch member $m^2$ at each revolution of the grooved clutch sleeve $m^4$ which is fast on the cam shaft $M^1$. The sliding clutch pin or member $m^3$ has a notch $m^7$ to engage the clutch disengaging device $m^6$. The clutch pin or member $m^3$ has a stem $m^8$ engaged by a spring $m^9$, to hold it in engagement with the clutch member $m^2$. The cam shaft $M^1$ is also provided with a stop cam N, having a notch $n$ engaging a roller $n^1$ on the lock arm $n^2$ of the clutch operating lever $N^1$, which is connected by a link $N^2$ with the treadle E through the rock shaft $E^5$ arm $E^4$ and link $E^3$. The locking arm $n^2$ is withdrawn from the stop cam on the shaft $M^1$, to permit it to turn at the beginning of each seaming cycle or period of operation, by depressing the foot treadle E which moves the clutch lever $N^1$ which moves safety device P on the link $p$ into engagement with the trip lever R of the clutch disengaging device $m^6$. The trip lever R is furnished with a roller $r$ to support the link $p$ of the safety trip device.

In the modification illustrated in Figs. 12 and 13 the seaming roller holders are shown as reciprocating slides 12, having adjustable members 13 which directly carry the seaming rollers, said members 13 being adjusted on the slides 12 by an adjusting worm 14 engaging a rack or teeth 15 on the slides 12. As in this modification the toggle acting arms or levers 17—18, which connect the tool holder slides with the seaming roller operating sleeve or head H, both swing in vertical planes. The universal joint or ball and socket connection between these toggle links or arms is, of course, unnecessary and is omitted.

Figure 14:
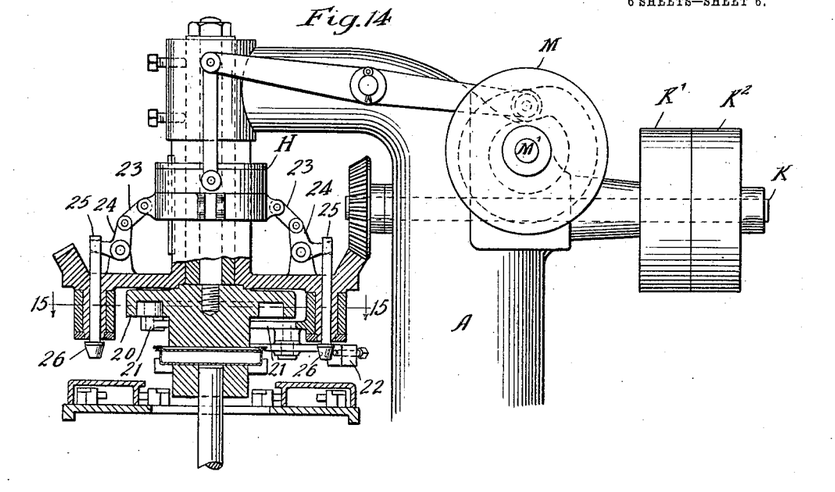
Fig. 14 is a side elevation, partly in vertical section, illustrating a modification for operating upon rectangular cans.
Figure 15:
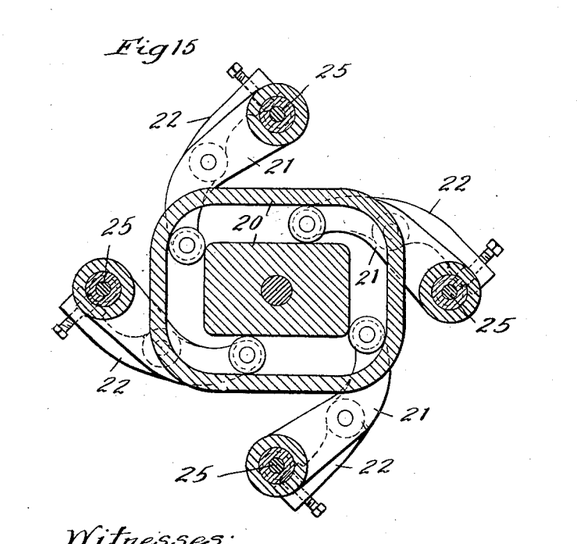
Fig. 15 is a horizontal section on line 15—15 of Fig. 14.
Figure 16:
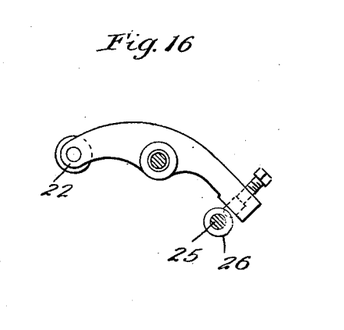

In the modification illustrated in Figs. 14 and 15, to adapt the machine for operation on irregular cans, a stationary pattern cam 20 is added, together with supplemental carriers or levers 21 actuated by the pattern cam and upon which the seaming roller holders 22 are directly mounted, the seaming roller holders being actuated from the reciprocating sleeve or head H, through the toggle links or levers 23, 24 and pins 25 carrying cones or wedges 26 at their lower ends.

I claim:

1. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming roller holders, and toggle levers or arms connecting said reciprocating sleeve with the seaming roller holders and actuating the seaming rollers in succession, substantially as specified.

2. In a double seaming machine, the combination with a continuously rotating seaming head, successively acting double seaming rollers and seaming roller holders mounted thereon, the reciprocating sleeve rotating with said seaming head, and toggle-acting mechanism connecting said sleeve and seaming roller holders and actuating the seaming rollers in succession, substantially as specified.

3. In a double seaming machine, the combination with a continuously rotating seaming head, successively acting double seaming rollers and seaming roller holders mounted thereon, the reciprocating sleeve rotating with said seaming head, and toggle-acting mechanism connecting said sleeve and seaming roller holders, and means for automatically reciprocating said sleeve to actuate the seaming rollers in succession, substantially as specified.

4. In a stationary can double seaming machine, the combination with a pair of can holder chucks, of a foot lever or treadle for reciprocating one of said chucks, a continuously rotating seaming head surrounding the upper chucks, successively acting double seaming rollers and seaming roller holders carried thereby, a reciprocating sleeve rotating with said seaming head for actuating the seaming rollers, mechanism connecting said sleeve with said seaming roller holders and actuating the seaming rollers in succession, mechanism for operating said sleeve, connections for setting said sleeve operating mechanism in action by movement of the foot lever or treadle, and a stop mechanism for automatically disengaging said operating mechanism at the completion of each seaming cycle or period independent of the action of the foot treadle, substantially as specified.

5. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, and toggle mechanism connecting said sleeve and seaming roller holders and actuating the seaming rollers in succession, substantially as specified.

6. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders and actuating the seaming rollers in succession, and mechanism for operating said sleeve, substantially as specified.

7. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers in succession, toggle mechanism connecting said sleeve and seaming roller holders, mechanism for operating said sleeve, a foot lever or treadle for reciprocating one of said can holder chucks, and connections for setting said sleeve operating mechanism in action by a movement of said foot lever or treadle, substantially as specified.

8. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers in succession, toggle mechanism connecting said sleeve and seaming roller holders, mechanism for operating said sleeve, a foot lever or treadle for reciprocating one of said can holder chucks, connections for seating said sleeve operating mechanism in action by a movement of said foot lever or treadle, and a stop mechanism for automatically disengaging said sleeve operating mechanism, substantially as specified.

9. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers in succession, toggle mechanism connecting said sleeve and seaming roller holders, mechanism for operating said sleeve, a foot lever or treadle for reciprocating one of said can holder chucks, connections for setting said sleeve operating mechanism in action by a movement of said foot lever or treadle, and a stop mechanism for automatically disengaging said sleeve operating mechanism, said stop mechanism being automatically actuated independent of said foot lever or treadle at the completion of each cycle or seaming period, substantially as specified.

10. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers in succession, toggle mechanism connecting said sleeve and seaming roller holders, mechanism for operating said sleeve, a foot lever or treadle for reciprocating one of said can holder chucks, and connections for setting said sleeve operating mechanism in action by movement of said foot lever or treadle, a clutch for connecting and disconnecting said sleeve operating mechanism, a clutch lever operated by said foot lever or treadle, a locking arm on said clutch lever, a stop cam and means for connecting and disconnecting said stop cam with said sleeve operating mechanism at the beginning and end of each cycle or seaming period, substantially as specified.

11. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders, and an intermittently rotating cam for operating said sleeve, substantially as specified.

12. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders and actuating the seaming rollers in succession, an intermittently rotating cam for operating said sleeve, and a stop cam for controlling the stopping and starting of said intermittently rotating cam at the beginning and end of each seaming cycle or period, substantially as specified.

13. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders and actuating the seaming rollers in succession, an intermittently rotating cam for operating said sleeve, a foot lever or treadle, and means for setting said intermittently rotating cam in operation by movement of said foot lever or treadle, substantially as specified.

14. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders and actuating the seaming roller in succession, an intermittently rotating cam for operating said sleeve, a stop cam for controlling the stopping and starting of said intermittently rotating cam at the beginning and end of each seaming cycle or period, a foot lever or treadle, and means for setting said intermittently rotating cam in operation by means of said foot lever or treadle, substantially as specified.

15. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism connecting said sleeve and seaming roller holders and actuating the seaming rollers in succession, an intermittently rotating cam for operating said sleeve, a foot lever or treadle, means for setting said intermittently rotating cam in operation by movement of said foot lever or treadle, and means for releasing said stop cam by action of said foot lever or treadle, substantially as specified.

16. In a stationary can double seaming machine, the combination with a pair of can holder chucks, of a continuously rotating seaming head, successively acting double seaming rollers and seaming roller holders carried thereby, a reciprocating sleeve rotating with said seaming head for actuating the seaming rollers, toggle mechanism for connecting said sleeve and seaming roller holders and actuating the seaming rollers in succession, an intermittently rotating cam for operating said sleeve, a foot lever or treadle, means for setting said intermittently rotating cam in operation, means for releasing said stop cam by action of said foot lever or treadle, and means for stopping said intermittently rotating cam automatically independent of the action of said foot lever or treadle, substantially as specified.

17. In a stationary can double seaming machine, the combination with a continuously rotating seaming head, of successively acting double seaming rollers, of seaming roller holders having horizontally swinging arms carrying the seaming rollers and provided with operating arms, a reciprocating sleeve rotating with said seaming head for actuating the seaming roller holders and actuating the seaming rollers in succession, pivoted links or toggle arms connecting said sleeve with the operating arms of said holders and having universal joint connection therewith, substantially as specified.

18. In a stationary can double seaming machine, the combination with a continuously rotating seaming head, of successively acting double seaming rollers, of seaming roller holders having horizontally swinging arms carrying the seaming rollers and provided with operating arms, a reciprocating sleeve rotating with said seaming head for actuating the seaming roller holders and actuating the seaming rollers in succession, pivoted links or toggle arms connecting said sleeve with the operating arms of said holders and having a ball and socket joint connection therewith, substantially as specified.

19. In a can seaming machine, the combination with a rotating seaming-head carrying successively acting double seaming rollers and seaming roller operating levers, of a reciprocating sleeve rotating with said seaming head, and toggle mechanism connecting said sleeve with said seaming roller operating levers and actuating the seaming rollers in succession, substantially as specified.

20. In a can seaming machine, the combination with a rotating seaming head carrying successively acting double seaming rollers and seaming roller operating levers, of a reciprocating sleeve rotating with said seaming head, and toggle mechanism connecting said sleeve with said seaming roller operating levers and actuating the seaming rollers in succession, said toggle mechanism having universal joint connections, substantially as specified.

21. In a can seaming machine, the combination with a rotating seaming head carrying successively acting double seaming rollers and seaming roller operating levers, of a reciprocating sleeve rotating with said seaming head, and toggle mechanism connecting said sleeve with said seaming roller operating levers and actuating the seaming rollers in succession, said toggle mechanism having ball and socket joint connections, substantially as specified.

22. In a can seaming machine, the combination with a rotating seaming head carrying successively acting double seaming rollers and seaming roller operating levers, of a reciprocating sleeve rotating with said seaming head, toggle mechanism connecting said sleeve with said seaming roller operating levers and actuating the seaming rollers in succession, and an intermittently rotating cam for operating said sleeve, substantially as specified.

23. In a can seaming machine, the combination with a rotating seaming head carrying successively acting double seaming rollers and seaming roller operating levers, of a reciprocating sleeve rotating with said seaming head, toggle mechanism connecting said sleeve with said seaming roller operating levers and actuating the seaming rollers in succession, an intermittently rotating cam for operating said sleeve, and a stop cam, substantially as specified.

24. In a can seaming machine, the combination with a rotating seaming head carrying successively acting double seaming rollers and seaming roller operating levers, of a reciprocating sleeve rotating with said seaming head, toggle mechanism connecting said sleeve with said seaming roller operating levers and actuating the seaming rollers in succession, an intermittently rotating cam for operating said sleeve, a stop cam, an upper can holder chuck, a lower reciprocating can holder chuck, a foot lever for operating said lower chuck, releasing mechanism for said stop cam, and connections between said foot lever or treadle and said stop cam releasing mechanism, substantially as specified.

25. In a can seaming machine, the combination with a rotating seaming head carrying successively acting double seaming rollers and seaming roller operating levers, of a reciprocating sleeve rotating with said seaming head, toggle mechanism connecting said sleeve with said seaming roller operating levers and actuating the seaming rollers in succession, an intermittently rotating cam for operating said sleeve, a stop cam, an upper can holder chuck, a lower reciprocating can holder chuck, a foot lever for operating said lower chuck, releasing mechanism for said stop cam, connections between said foot lever or treadle and said stop cam releasing mechanism, and clutch mechanism for said intermittently rotating cam, substantially as specified.

26. In a can seaming machine, the combination with a rotating seaming head carrying successively acting double seaming rollers and seaming roller operating levers, of a reciprocating sleeve rotating with said seaming head, toggle mechanism connecting said sleeve with said seaming roller operating levers and actuating the seaming rollers in succession, an intermittently rotating cam for operating said sleeve, a stop cam, an upper can holder chuck, a lower reciprocating can holder chuck, a foot lever for operating said lower chuck, releasing mechanism for said stop cam, connections between said foot lever or treadle and said stop releasing mechanism, clutch mechanism for said intermittently rotating cam, and a safety trip device for controlling the action of said clutch mechanism, substantially as specified.

OLAF OSTLIN.

Witnesses:
H. M. MUNDAY,
PEARL ABRAMS.